United States Patent
Peterson et al.

(10) Patent No.: US 9,779,398 B2
(45) Date of Patent: Oct. 3, 2017

(54) SELECTING A CONTACTLESS PAYMENT CARD

(71) Applicant: Lenovo (Singapore) Pte. Ltd., Singapore (SG)

(72) Inventors: Nathan J. Peterson, Durham, NC (US); Amy L. Rose, Chapel, NC (US); John S. Crowe, Durham, NC (US); Jennifer Lee-Baron, Morrisville, NC (US); Bryan L. Young, Tualatin, OR (US)

(73) Assignee: Lenovo (Singapore) Pte. Ltd., Singapore (SG)

( * ) Notice: Subject to any disclaimer, the term of this patent is extended or adjusted under 35 U.S.C. 154(b) by 21 days.

(21) Appl. No.: 14/642,622

(22) Filed: Mar. 9, 2015

(65) Prior Publication Data

US 2016/0267468 A1 Sep. 15, 2016

(51) Int. Cl.
*G06K 5/00* (2006.01)
*G06Q 20/34* (2012.01)
*G06Q 30/02* (2012.01)

(52) U.S. Cl.
CPC ....... *G06Q 20/352* (2013.01); *G06Q 20/3572* (2013.01); *G06Q 30/0238* (2013.01)

(58) Field of Classification Search
CPC ..... G06Q 20/10; G06Q 20/08; G06Q 20/3572
USPC ................ 235/379; 705/35, 39, 41
See application file for complete search history.

(56) References Cited

U.S. PATENT DOCUMENTS

| | | | |
|---|---|---|---|
| 7,413,113 B1 | 8/2008 | Zhu | |
| 8,113,438 B1 * | 2/2012 | Leason | G06Q 20/102 235/379 |
| 2002/0062249 A1 * | 5/2002 | Iannacci | 705/14 |
| 2008/0078831 A1 * | 4/2008 | Johnson et al. | 235/380 |
| 2009/0018924 A1 * | 1/2009 | Roberts | G06Q 20/10 705/21 |
| 2009/0065582 A1 * | 3/2009 | Kon | G06K 7/0008 235/439 |
| 2009/0192904 A1 | 7/2009 | Patterson et al. | |
| 2010/0017325 A1 * | 1/2010 | Scherpa | G06Q 20/10 705/39 |
| 2011/0180598 A1 * | 7/2011 | Morgan et al. | 235/380 |

(Continued)

FOREIGN PATENT DOCUMENTS

| | | |
|---|---|---|
| GB | 2530345 | 3/2016 |
| WO | 2010083454 | 7/2010 |

OTHER PUBLICATIONS

Combined Search Report under Section 17(5)(b) and Abbreviated Examination Report under Section 18(3) for Application No. GB1603975.2, U.K. Intellectual Property Office, dated Jul. 14, 2016, 5 pages.

*Primary Examiner* — Laura Gudorf
(74) *Attorney, Agent, or Firm* — VanLeeuwen & VanLeeuwen; Carlos Munoz-Bustamante (57) ABSTRACT

An approach is provided for purchasing items using contactless payment devices (credit cards and debit cards, key fobs, smartcards or other devices). The approach retrieves the contactless payment identifiers that each pertain to a separate payment account used by a user. One of the contactless payment identifiers is selected based on one or more selection criteria, such as user and monetary incentives. The approach further pays for purchases using the payment account that corresponds to the selected contactless payment identifier.

18 Claims, 6 Drawing Sheets

(56) References Cited

U.S. PATENT DOCUMENTS

| | | | |
|---|---|---|---|
| 2012/0109764 A1* | 5/2012 | Martin | G06Q 20/204 705/17 |
| 2012/0265685 A1* | 10/2012 | Brudnicki | G06Q 30/06 705/44 |
| 2012/0290449 A1* | 11/2012 | Mullen | G06Q 10/00 705/27.2 |
| 2013/0110656 A1* | 5/2013 | Chau et al. | 705/17 |
| 2014/0183269 A1* | 7/2014 | Glaser | G06F 21/32 235/492 |
| 2014/0279471 A1 | 9/2014 | England et al. | |
| 2014/0279474 A1 | 9/2014 | Evans et al. | |

* cited by examiner

SELECTING A CONTACTLESS PAYMENT CARD

BACKGROUND

Contactless payment systems are credit cards and debit cards, key fobs, smartcards or other devices that use radio-frequency identification for making secure payments. The embedded chip and antenna enable consumers to wave their card or fob over a reader at the point of sale. Some suppliers claim that transactions can be almost twice as fast as a conventional cash, credit, or debit card purchase. A challenge exists pertaining to users that have multiple contactless payment devices (credit cards and debit cards, key fobs, smartcards or other devices). Currently, the user needs to either select one of the contactless payment devices and wave the selected device over the reader or, if a set of contactless payment devices are waived over the reader, the current system will select one of the cards more or less "at random" (e.g., the first contactless payment devices read by the reader, etc.). The current approach therefore either causes delays in what purports to be a faster checkout and payment system when the user has to sift through the available contactless payment devices and select one or causes user frustration when the "at random" approach does not select the user's preferred card for the transaction.

SUMMARY

An approach is provided for purchasing items using contactless payment devices (credit cards and debit cards, key fobs, smartcards or other devices). The approach retrieves the contactless payment identifiers that each pertain to a separate payment account used by a user. One of the contactless payment identifiers is selected based on one or more selection criteria, such as user and monetary incentives. The approach further pays for purchases using the payment account that corresponds to the selected contactless payment identifier.

The foregoing is a summary and thus contains, by necessity, simplifications, generalizations, and omissions of detail; consequently, those skilled in the art will appreciate that the summary is illustrative only and is not intended to be in any way limiting. Other aspects, inventive features, and advantages will become apparent in the non-limiting detailed description set forth below.

BRIEF DESCRIPTION OF THE DRAWINGS

This disclosure may be better understood by referencing the accompanying drawings, wherein.

DETAILED DESCRIPTION

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The detailed description has been presented for purposes of illustration, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

As will be appreciated by one skilled in the art, aspects may be embodied as a system, method or computer program product. Accordingly, aspects may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present disclosure may take the form of a computer program product embodied in one or more computer readable medium(s) having computer readable program code embodied thereon.

Any combination of one or more computer readable storage medium(s) may be utilized. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device. As used herein, a computer readable storage medium does not include a transitory signal.

Computer program code for carrying out operations for aspects of the present disclosure may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present disclosure are described below with reference to flowchart illustrations and/or block diagrams of methods, apparatus (systems) and computer program products. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The following detailed description will generally follow the summary, as set forth above, further explaining and expanding the definitions of the various aspects and embodiments as necessary. To this end, this detailed description first sets forth a computing environment in FIG. 1 that is suitable to implement the software and/or hardware techniques associated with the disclosure. A networked environment is illustrated in FIG. 2 as an extension of the basic computing environment, to emphasize that modern computing techniques can be performed across multiple discrete devices.

Figure 1:
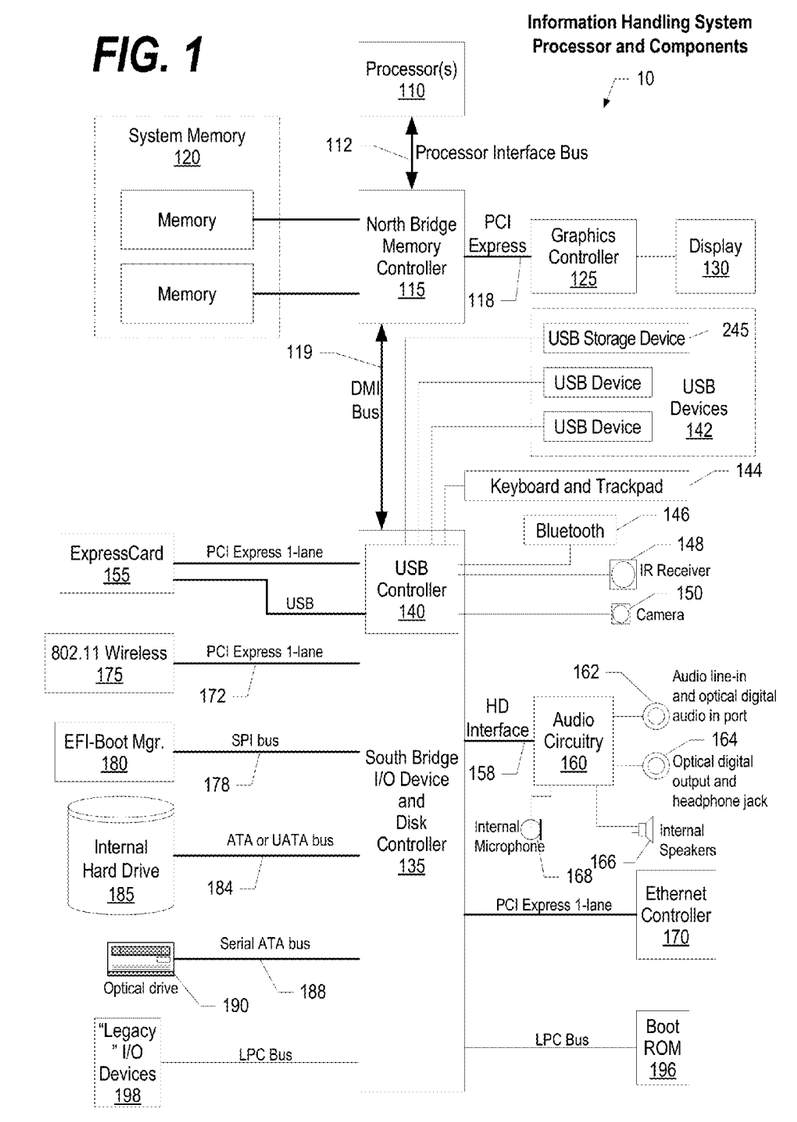
FIG. 1 is a block diagram of a data processing system in which the methods described herein can be implemented.
Figure 2:
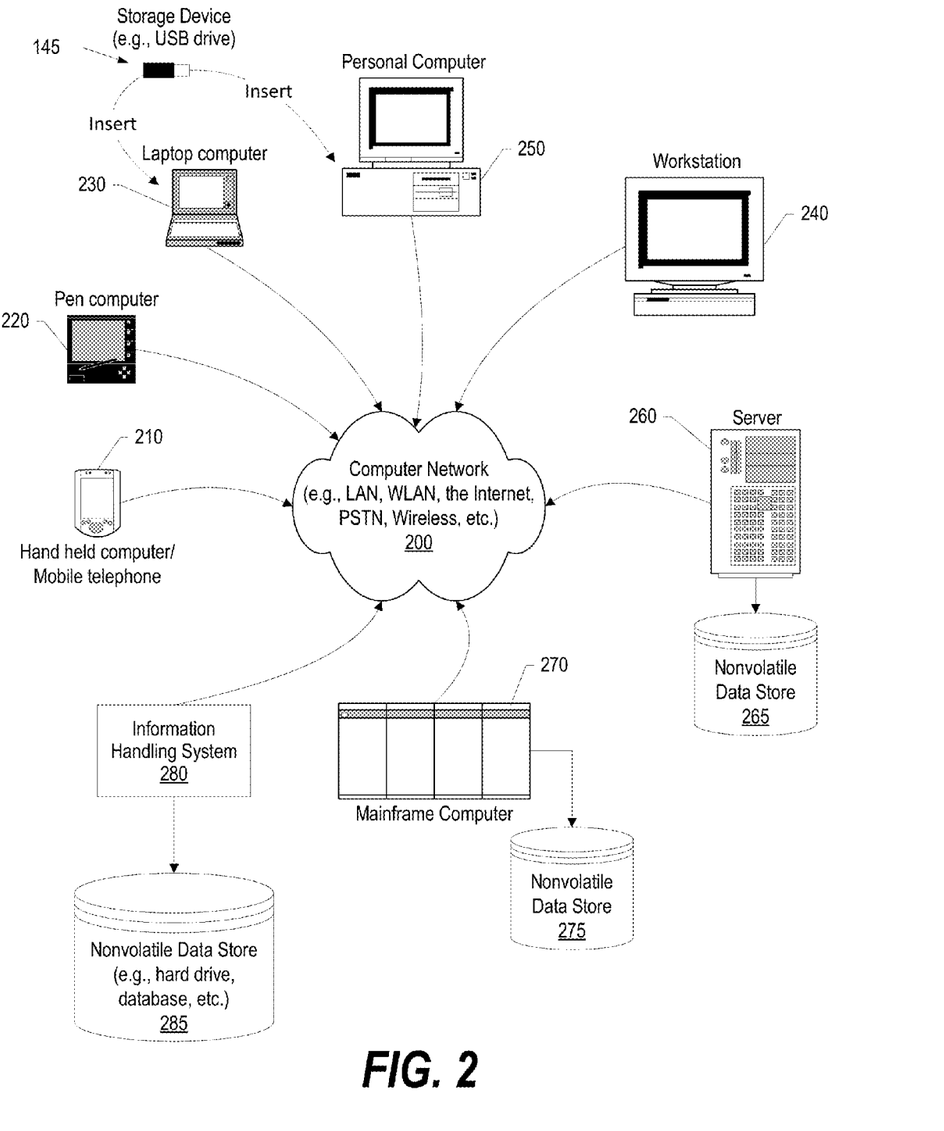
FIG. 2 provides an extension of the information handling system environment shown in FIG. 1 to illustrate that the methods described herein can be performed on a wide variety of information handling systems which operate in a networked environment.

FIG. 1 illustrates information handling system 100, which is a simplified example of a computer system capable of performing the computing operations described herein. Information handling system 100 includes one or more processors 110 coupled to processor interface bus 112. Processor interface bus 112 connects processors 110 to Northbridge 115, which is also known as the Memory Controller Hub (MCH). Northbridge 115 connects to system memory 120 and provides a means for processor(s) 110 to access the system memory. Graphics controller 125 also connects to Northbridge 115. In one embodiment, PCI Express bus 118 connects Northbridge 115 to graphics controller 125. Graphics controller 125 connects to display device 130, such as a computer monitor.

Northbridge 115 and Southbridge 135 connect to each other using bus 119. In one embodiment, the bus is a Direct Media Interface (DMI) bus that transfers data at high speeds in each direction between Northbridge 115 and Southbridge 135. In another embodiment, a Peripheral Component Interconnect (PCI) bus connects the Northbridge and the Southbridge. Southbridge 135, also known as the I/O Controller Hub (ICH) is a chip that generally implements capabilities that operate at slower speeds than the capabilities provided by the Northbridge. Southbridge 135 typically provides various busses used to connect various components. These busses include, for example, PCI and PCI Express busses, an ISA bus, a System Management Bus (SMBus or SMB), and/or a Low Pin Count (LPC) bus. The LPC bus often connects low-bandwidth devices, such as boot ROM 196 and "legacy" I/O devices (using a "super I/O" chip). The "legacy" I/O devices (198) can include, for example, serial and parallel ports, keyboard, mouse, and/or a floppy disk controller. The LPC bus also connects Southbridge 135 to Trusted Platform Module (TPM) 195. Other components often included in Southbridge 135 include a Direct Memory Access (DMA) controller, a Programmable Interrupt Controller (PIC), and a storage device controller, which connects Southbridge 135 to nonvolatile storage device 185, such as a hard disk drive, using bus 184.

ExpressCard 155 is a slot that connects hot-pluggable devices to the information handling system. ExpressCard 155 supports both PCI Express and USB connectivity as it connects to Southbridge 135 using both the Universal Serial Bus (USB) the PCI Express bus. Southbridge 135 includes USB Controller 140 that provides USB connectivity to devices that connect to the USB. These devices include webcam (camera) 150, infrared (IR) receiver 148, keyboard and trackpad 144, and Bluetooth device 146, which provides for wireless personal area networks (PANs). USB Controller 140 also provides USB connectivity to other miscellaneous USB connected devices 142, such as a mouse, removable nonvolatile storage device 145, modems, network cards, ISDN connectors, fax, printers, USB hubs, and many other types of USB connected devices. While removable nonvolatile storage device 145 is shown as a USB-connected device, removable nonvolatile storage device 145 could be connected using a different interface, such as a Firewire interface, etcetera.

Wireless Local Area Network (LAN) device 175 connects to Southbridge 135 via the PCI or PCI Express bus 172. LAN device 175 typically implements one of the IEEE 802.11 standards of over-the-air modulation techniques that all use the same protocol to wireless communicate between information handling system 100 and another computer system or device. Optical storage device 190 connects to Southbridge 135 using Serial ATA (SATA) bus 188. Serial ATA adapters and devices communicate over a high-speed serial link. The Serial ATA bus also connects Southbridge 135 to other forms of storage devices, such as hard disk drives. Audio circuitry 160, such as a sound card, connects to Southbridge 135 via bus 158. Audio circuitry 160 also provides functionality such as audio line-in and optical digital audio in port 162, optical digital output and headphone jack 164, internal speakers 166, and internal microphone 168. Ethernet controller 170 connects to Southbridge 135 using a bus, such as the PCI or PCI Express bus. Ethernet controller 170 connects information handling system 100 to a computer network, such as a Local Area Network (LAN), the Internet, and other public and private computer networks.

While FIG. 1 shows one information handling system, an information handling system may take many forms. For example, an information handling system may take the form of a desktop, server, portable, laptop, notebook, or other form factor computer or data processing system. In addition, an information handling system may take other form factors such as a personal digital assistant (PDA), a gaming device, ATM machine, a portable telephone device, a communication device or other devices that include a processor and memory.

The Trusted Platform Module (TPM 195) shown in FIG. 1 and described herein to provide security functions is but one example of a hardware security module (HSM). Therefore, the TPM described and claimed herein includes any type of HSM including, but not limited to, hardware security devices that conform to the Trusted Computing Groups (TCG) standard, and entitled "Trusted Platform Module (TPM) Specification Version 1.2." The TPM is a hardware security subsystem that may be incorporated into any number of information handling systems, such as those outlined in FIG. 2.

FIG. 2 provides an extension of the information handling system environment shown in FIG. 1 to illustrate that the methods described herein can be performed on a wide variety of information handling systems that operate in a networked environment. Types of information handling systems range from small handheld devices, such as handheld computer/mobile telephone 210 to large mainframe systems, such as mainframe computer 270. Examples of handheld computer 210 include personal digital assistants (PDAs), personal entertainment devices, such as MP3 players, portable televisions, and compact disc players. Other examples of information handling systems include pen, or tablet, computer 220, laptop, or notebook, computer 230, workstation 240, personal computer system 250, and server 260. Other types of information handling systems that are not individually shown in FIG. 2 are represented by information handling system 280. As shown, the various information handling systems can be networked together using computer network 200. Types of computer network that can be used to interconnect the various information handling systems include Local Area Networks (LANs), Wireless Local Area Networks (WLANs), the Internet, the Public Switched Telephone Network (PSTN), other wireless networks, and any other network topology that can be used to interconnect the information handling systems. Many of the information handling systems include nonvolatile data stores, such as hard drives and/or nonvolatile memory. Some of the information handling systems shown in FIG. 2 depicts separate nonvolatile data stores (server 260 utilizes nonvolatile data store 265, mainframe computer 270 utilizes nonvolatile data store 275, and information handling system 280 utilizes nonvolatile data store 285). The nonvolatile data store can be a component that is external to the various information handling systems or can be internal to one of the information handling systems. In addition, removable nonvolatile storage device 145 can be shared among two or more information handling systems using various techniques, such as connecting the removable nonvolatile storage device 145 to a USB port or other connector of the information handling systems.

Figure 3:
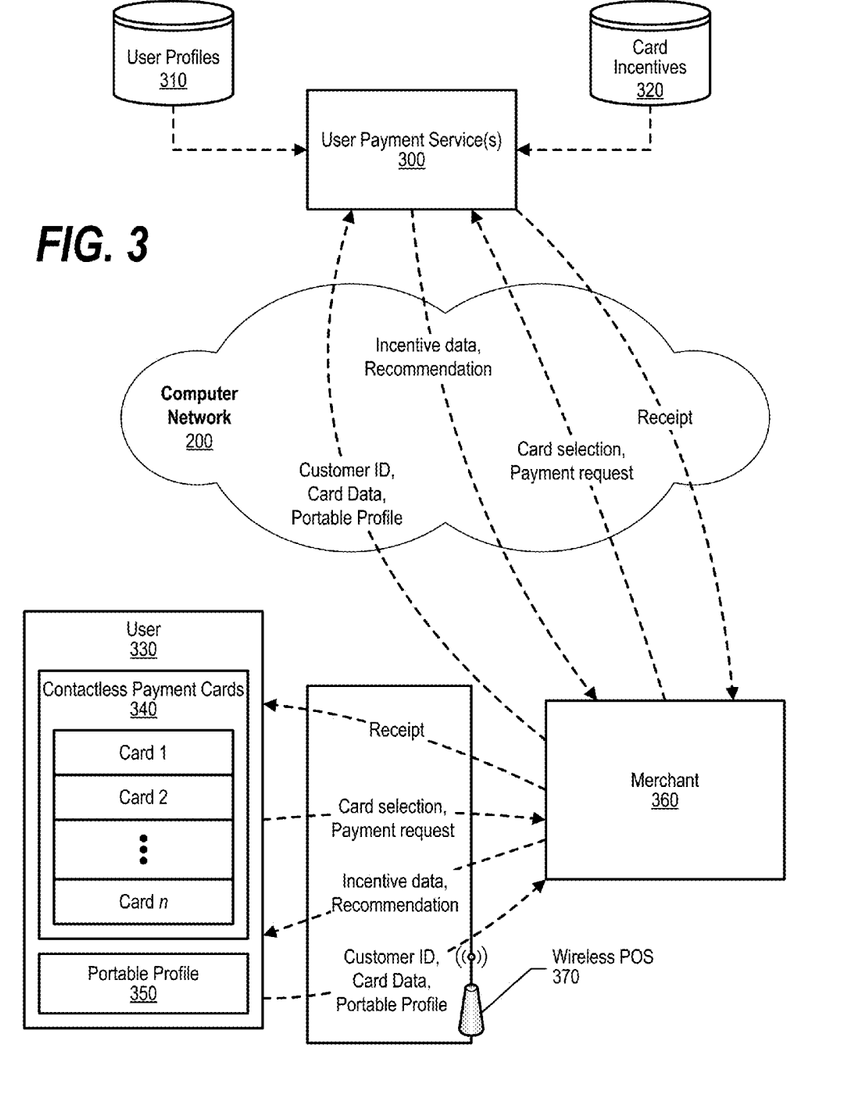
FIG. 3 is a component diagram depicting interactions between the various components that selects a contactless payment identifier from the user's set of contactless payment identifiers.

FIG. 3 is a component diagram depicting interactions between the various components that selects a contactless payment identifier from the user's set of contactless payment identifiers. User payment service, or services, 300 receives the customer's identifier (e.g., contactless payment identifiers, etc.) and any card data (e.g., expiration date, etc.) associated with the contactless payment identifier pertaining to each of the contactless payment accounts that correspond to the user. In addition, the user's preferences may be stored at the payment service computer system (profiles 310) or by the user in the user's portable smart device (portable profile 350).

As previously mentioned, the user has multiple contactless payment devices (contactless payment cards 340, e.g., credit cards and debit cards, key fobs, smartcards or other devices). Each of the devices has a unique contactless payment identifier (e.g., account number, etc.) and is associated with a payment account (e.g., credit card account, debit card account, etc.).

Payment services computer system 300 retrieves incentives pertaining to the various payment accounts from data store 320. These incentives are matched against the user's preferences. For example, one payment service account may give a higher discount, or cash back, for the items being purchased by the user. If the user has not established preferences, a set of default preferences can be utilized by payment service 300. Incentive data pertaining to payment accounts as well as any payment account recommendations are returned by payment service 300 to merchant 360. Such incentive data and recommendations are then provided from merchant 360 to user 330. In one embodiment the data is displayed on a display device at the merchant, such as the point-of-sale (POS) device and the user can select the contactless payment identifier that the user wishes to use for the transaction. In another embodiment, the data is returned to user 330, such as at the user's portable smart device, from which the user selects the contactless payment identifier to use for the transaction. The selected contactless payment identifier is returned to merchant 360 and transmitted to the appropriate payment system to request payment for the transaction using the payment account corresponding to the selected contactless payment identifier.

In one embodiment, data transmitted between the user's devices (contactless payment devices, portable smart device, etc.) is performed using wireless POS device 370. Data between merchant system 360 and payment services 300 are transmitted via computer network 200, such as the Internet. The payment service corresponding to the payment account pertaining to the selected contactless payment identifier receives the contactless payment identifier and the payment request (e.g., merchant identifier, amount of purchase, etc.). Once payment is successfully processed by the payment service (e.g., sufficient funds or credit limit, etc.), then the payment service returns a receipt, or record of the transaction to merchant 360. Merchant 360 follows by transmitting receipt, either paper or electronic, to user 330.

Figure 4:
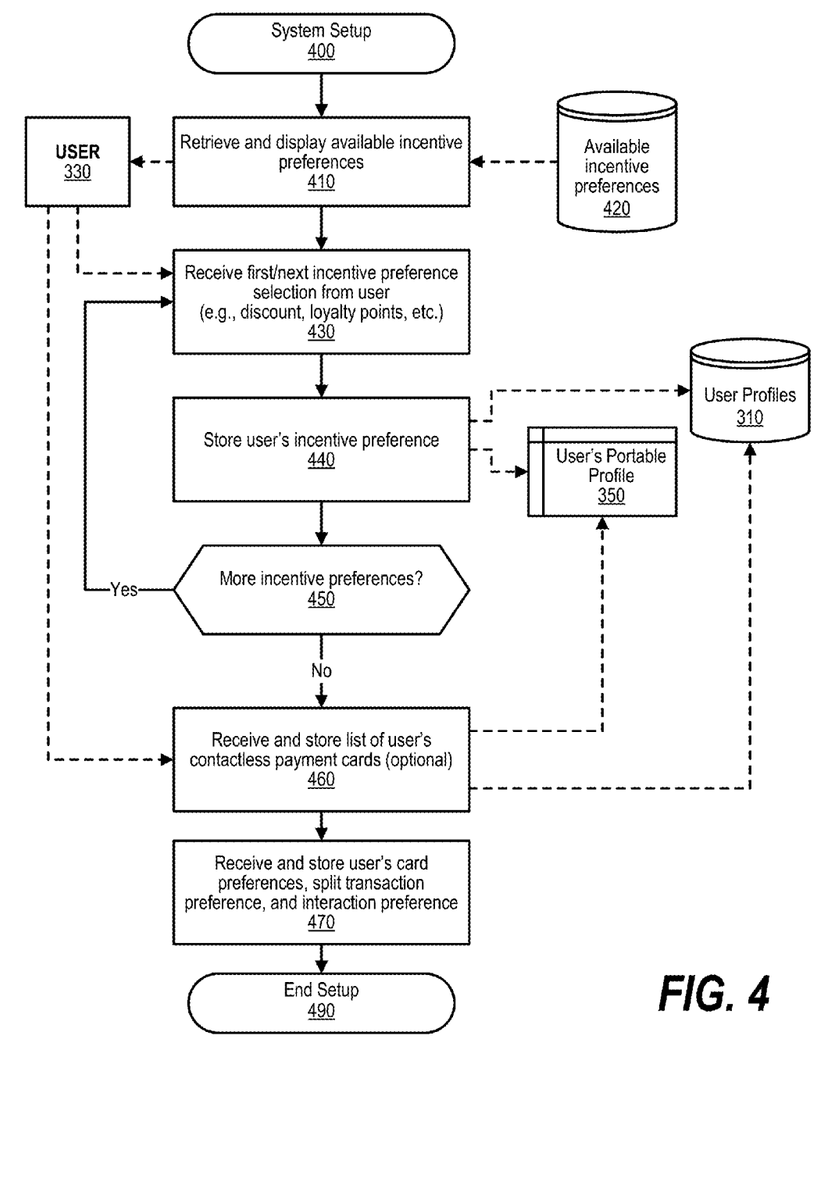
FIG. 4 is a flowchart showing steps taken by a setup process.

FIG. 4 is a flowchart showing steps taken by a setup process. FIG. 4 processing commences at 400 whereupon, at step 410, the process retrieves and display available incentive preferences from data store 420. The available incentive preferences are provided to user 330, such as by using a display on the user's portable smart device or other computing device.

At step 430, the process receives the first incentive preference selection from user (e.g., discount, loyalty points, etc.). At step 440, the process stores the user's incentive preference. In one embodiment, the user's incentive preferences are stored in user profile 310 that is maintained by the payment systems. In another embodiment, the user's preferences are stored in the user's portable profile 350, such as on the user's portable smart device. In addition, the user's preferences can be stored on both user's profile 310 and user's portable profile 350. The process determines as to whether there are more incentive preferences that the user wishes to select (decision 450). If there are more incentive preferences that the user wishes to select, then decision 450 branches to the 'yes' branch which loops back to receive the next incentive preference from the user. This looping continues until no more incentive preferences are being selected by the user, at which decision 450 branches to the 'no' branch exiting the loop.

At step 460, as an optional step, the process may receive and store the list of the user's contactless payment cards (e.g., contactless payment identifiers, etc.). At step 470, the process receives and stores the user's contactless payment account preferences, split transaction preference, and interaction preference. The split transaction preference allows the user to use a single payment account when checking out at a merchant or multiple accounts. The interaction preference determines whether the user wishes to interact with the point of sale (POS) system to select the payment account or, instead, would like the payment account to be selected automatically based on matching the user's preferences with the incentives offered by the payment services pertaining to the user's multiple payment accounts. The setup processing shown in FIG. 4 thereafter ends at 490.

Figure 5:
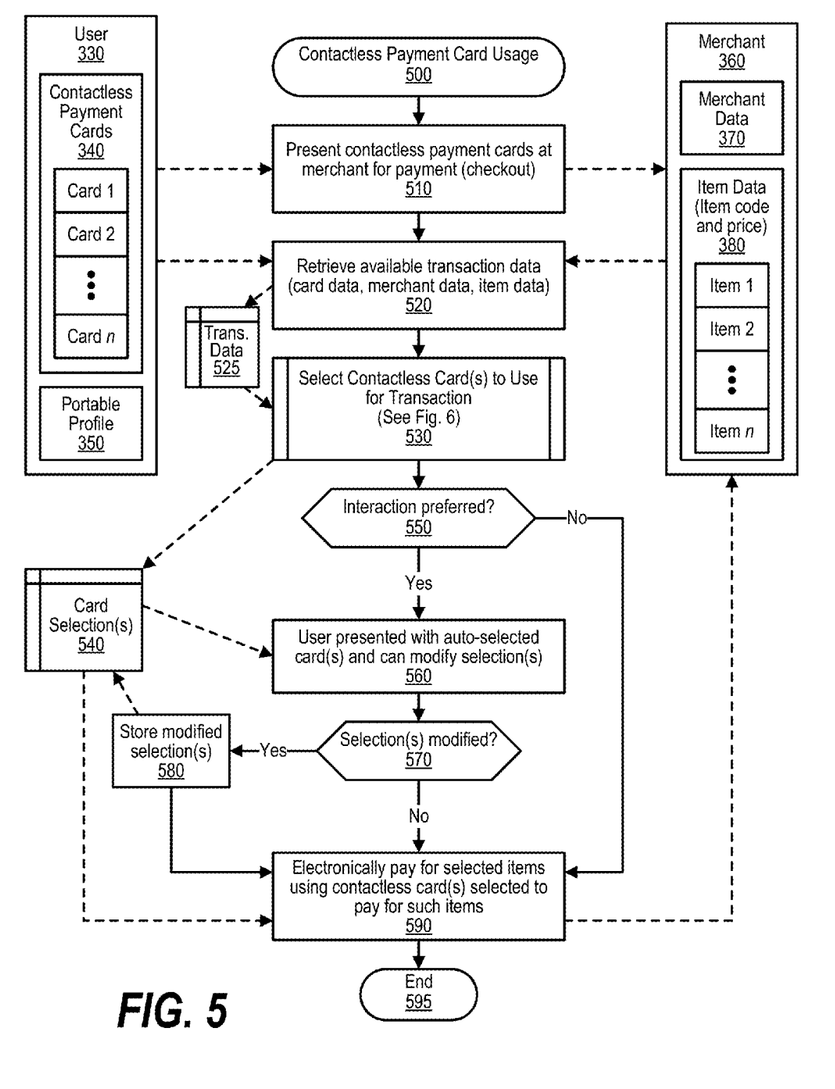
FIG. 5 is a flowchart showing steps taken by a process that selects a contactless payment identifier and processes a payment for the selected identifier.

FIG. 5 is a flowchart showing steps taken by a process that selects a contactless payment identifier and processes a payment for the selected identifier. FIG. 5 commences at 500 and shows the steps taken by a process that handles usage of contactless payment devices.

At step 510, the process presents contactless payment cards at merchant for payment (checkout at merchant's point-of-sale (POS) device). Step 510 retrieves the user's contactless payment device data 340 that include multiple contactless payment devices (e.g., contactless credit cards, contactless debit cards, etc.). Merchant 360 receives the data at the merchant's POS device. The merchant's system includes merchant data 370 that identifies the merchant where the transaction is occurring. In addition, the merchant's POS scans the items being purchased by the user to generate item data 380 with item data including an item code (e.g., UPC code, etc.) and a price for each item. At step 520, the process retrieves available transaction data (contactless payment device data 340 and portable profile data 350 from the user and merchant data 370 and item data 380 from the merchant). The available transaction data is stored in memory area 525.

Figure 6:
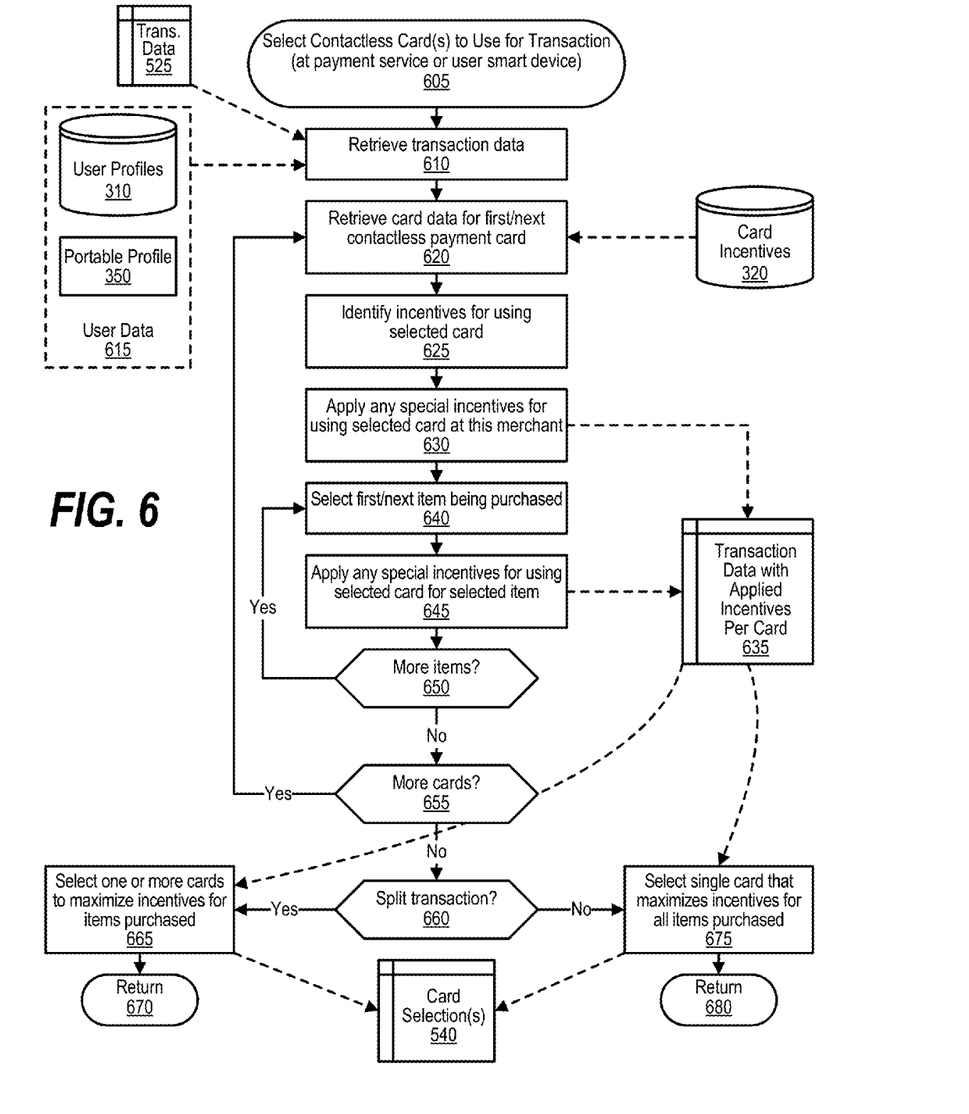
FIG. 6 is a flowchart showing steps taken by a process that selects one or more preferred contactless payment identifiers to use for a payment transaction at a payment service or at a user's portable smart device.

At predefined process 530, the process performs the Select Contactless Cards to Use for Transaction routine (see FIG. 6 and corresponding text for processing details). Predefined process 530 receives the transaction data from memory area 525 and outputs one or more selected contactless payment identifiers recommended to use for this transaction by comparing the user's preferences with the purchase data (merchant data and item data). The recommended contactless payment identifiers are stored in memory area 540.

The process determines as to whether interaction is preferred by the user (decision 550). During setup, the user selected whether interaction was preferred. If interaction is preferred, then the user is presented with the recommended contactless payment identifier prior to completing the purchase. However, if interaction is not preferred, the recommended contactless payment identifier is automatically used to complete the purchase with no user interaction required. If interaction is preferred by the user, then decision 550 branches to the 'yes' branch to perform steps 560 through 580. On the other hand, interaction is not preferred by the user, then decision 550 branches to the 'no' branch bypassing steps 560 through 580.

If interaction is preferred by the user, then steps 560 through 580 are performed. At step 560, the process presents the user with the recommended contactless payment identifiers that were selected by predefined process 530 and stored in memory area 540. The user is able to modify the selections (e.g., select a different contactless payment identifier to use for the transaction, etc.). The process determines as to whether the contactless payment identifier selection was modified by the user (decision 570). If the contactless payment identifier selection was modified by the user, then decision 570 branches to the 'yes' branch whereupon, at step 580, the process stores the contactless payment identifier selections provided by the user to memory area 540 and removes the previously selected identifiers that were recommended by predefined process 530. On the other hand, if the contactless payment identifier selection was not modified by the user, then decision 570 branches to the 'no' branch bypassing step 580.

At step 590, the process electronically pays for the items being purchased by the user using the selected contactless payment identifier selected to pay for such items as stored in memory area 540. The selected contactless payment identifier is provided to merchant system 360 and such payment identifier is then transmitted to the payment system for authorization and approval. FIG. 5 processing thereafter ends at 595.

FIG. 6 is a flowchart showing steps taken by a process that selects one or more preferred contactless payment identifiers to use for a payment transaction at a payment service or at a user's portable smart device. FIG. 6 commences at 605 and shows the steps taken by a process that performs the routine that select the contactless card to use for a transaction. The routine may be performed at an online payment service or by the user's portable smart device.

At step 610, the process retrieves the transaction data from memory area 525. At step 620, the process retrieves the contactless payment account data corresponding to the first contactless payment identifier assigned to the user. The contactless payment identifiers are included in user data 615. In addition, user data 615 includes user profile data that identifies the user's incentive preferences. These user preferences can be obtained from user profiles data store 310 maintained by the payment service system or from portable profile 350 maintained by the user in the user's portable smart device (e.g., smart phone, etc.). The incentives being offered by the various payment services are obtained from card incentives data store 320. For example, one service corresponding to one of the user's contactless payment identifiers may provide a five percent discount for food purchases and another service corresponding to another of the user's contactless payment identifiers may provide a two percent discount for non-food purchases.

At step 625, the process identifies the incentives that apply when using the selected contactless payment identifier. At step 630, the process applies any special incentives for using selected contactless payment identifier at this merchant. For example, a payment service may provide a two percent discount for any purchases made at a particular retail establishment. The transaction data with the applied incentives (e.g., discounts, points, etc.) are stored in memory area 635 for each of the user's contactless payment identifiers. At the conclusion of the loop, memory area 635 will contain the transaction data and applied incentives for all of the contactless payment identifiers so that a comparison can be performed.

At step 640, the process selects the first item being purchased by the user in this transaction. At step 645, the process applies any special incentives for using selected card for selected item. For example, the manufacturer of a particular product may have a promotional discount arrangement with a payment service for an additional discount when a card handled by the payment service is used to buy the product. Any such special incentives are calculated and stored in memory area 635. The process determines as to whether more items are being purchased by the user (decision 650). If more items are being purchased by the user, then decision 650 branches to the 'yes' branch to select and process the next item that is being purchased. This looping continues until all of the items have been processed, at which point decision 650 branches to the 'no' branch.

The process determines as to whether the user has more contactless payment identifiers that need to be processed to identify incentives pertaining to such identifiers (decision 655). If the user has more contactless payment identifiers that need to be processed, then decision 655 branches to the 'yes' branch which loops back to select and process the next contactless payment identifier as described above. This looping continues until all of the user's contactless payment identifiers have been processed, at which point decision 655 branches to the 'no' branch.

The process determines as to whether the user has selected a preference to split transactions among multiple contactless payment identifiers (decision 660). Split transactions allow some items to be purchased with one contactless payment identifier and other items to be purchased with a different contactless payment identifier in order to maximize incentives received by the user. If the user has selected a preference to split transactions among multiple contactless payment identifiers, then decision 660 branches to the 'yes' branch whereupon, at step 665, the process selects one or more contactless payment identifiers to use for the transaction based on the available incentives. The recommended contactless payment identifiers are stored in memory area 540 and processing returns to the calling routine (see FIG. 5) at 670.

Returning to decision 660, if the user has not selected a preference to split transactions among multiple contactless payment identifiers, then decision 660 branches to the 'no' branch whereupon, at step 675, the process selects a single contactless payment identifier to use for the transaction based on the available incentives. The recommended contactless payment identifier is stored in memory area 540 and processing returns to the calling routine (see FIG. 5) at 680.

While particular embodiments have been shown and described, it will be obvious to those skilled in the art that, based upon the teachings herein, that changes and modifications may be made without departing from this disclosure and its broader aspects. Therefore, the appended claims are to encompass within their scope all such changes and modifications as are within the true spirit and scope of this disclosure. Furthermore, it is to be understood that the invention is solely defined by the appended claims. It will be understood by those with skill in the art that if a specific number of an introduced claim element is intended, such intent will be explicitly recited in the claim, and in the absence of such recitation no such limitation is present. For non-limiting example, as an aid to understanding, the following appended claims contain usage of the introductory phrases "at least one" and "one or more" to introduce claim elements. However, the use of such phrases should not be construed to imply that the introduction of a claim element by the indefinite articles "a" or "an" limits any particular claim containing such introduced claim element to others containing only one such element, even when the same claim includes the introductory phrases "one or more" or "at least one" and indefinite articles such as "a" or "an"; the same holds true for the use in the claims of definite articles.

What is claimed is:

1. A machine-implemented method comprising:
receiving one or more user preferences;
retrieving, at a wireless point-of-sale reader, a plurality of contactless payment identifiers, wherein each of the contactless payment identifiers corresponds to a contactless payment card and pertains to a separate payment account;
automatically selecting one of the plurality of contactless payment identifiers based on one or more selection criteria, wherein the selection criteria include the user preferences; and
transmitting a payment request for one or more purchases using the payment account corresponding to the selected contactless payment identifier.

2. The method of claim 1 further comprising:
storing the one or more user preferences in a memory area included in at least one of the contactless payment cards associated with the contactless payment identifiers prior to the retrieval of the contactless payment identifiers; and
identifying the selected contactless payment identifier based on the received user preferences.

3. The method of claim 2 wherein one or more of the user preferences pertain to monetary incentives provided to the user.

4. The method of claim 1 further comprising:
receiving a receipt in response to the transmitting;
wirelessly transmitting the receipt to the contactless payment card associated with the selected contactless payment identifier; and
storing the receipt in a memory included in the contactless payment card.

5. The method of claim 1 further comprising:
storing the user preferences in a portable profile that is stored in a memory proximate a plurality of contactless payment cards pertaining to the separate payment accounts; and
retrieving, at the wireless point-of-sale reader, the user preferences from the portable profile prior to the automatic selection of one of the contactless payment identifiers.

6. The method of claim 1 further comprising:
notifying the user of the plurality of contactless payment cards of the automatically selected contactless payment identifier used in transmitting the payment request.

7. An information handling system comprising:
one or more processors;
a memory coupled to at least one of the processors;
a wireless point-of-sale reader accessible by at least one of the processors; and
a set of instructions stored in the memory and executed by at least one of the processors to:
receive one or more user preferences;
retrieve, at the wireless point-of-sale reader, a plurality of contactless payment identifiers, wherein each of the contactless payment identifiers corresponds to a contactless payment card and pertains to a separate payment account;

automatically select one of the plurality of contactless payment identifiers based on one or more selection criteria, wherein the selection criteria include the user preferences; and transmit a payment request for one or more purchases using the payment account corresponding to the selected contactless payment identifier.

8. The information handling system of claim 7 wherein the set of instructions further comprise:

storing the one or more user preferences in a memory area included in at least one of the contactless payment cards associated with the contactless payment identifiers prior to the retrieval of the contactless payment identifiers; and identify the selected contactless payment identifier based on the received user preferences.

9. The information handling system of claim 8 wherein one or more of the user preferences pertain to monetary incentives provided to the user.

10. The information handling system of claim 7 further comprising instructions executed by at least one of the processors to:

receive a receipt in response to the transmitting;

wirelessly transmit the receipt to the contactless payment card associated with the selected contactless payment identifier; and store the receipt in a memory included in the contactless payment card.

11. The information handling system of claim 7 further comprising instructions executed by at least one of the processors to:

store the user preferences in a portable profile that is stored in a memory proximate a plurality of contactless payment cards pertaining to the separate payment accounts; and retrieve, at the wireless point-of-sale reader, the user preferences from the portable profile prior to the automatic selection of one of the contactless payment identifiers.

12. The information handling system of claim 7 further comprising instructions executed by at least one of the processors to:

notify the user of the plurality of contactless payment cards of the automatically selected contactless payment identifier used in transmitting the payment request.

13. A computer program product comprising:

a computer readable storage medium comprising a set of computer instructions, the computer instructions effective to:

receive one or more user preferences;

retrieve, at a wireless point-of-sale reader, a plurality of contactless payment identifiers, wherein each of the contactless payment identifiers corresponds to a contactless payment card and pertains to a separate payment account;

automatically select one of the plurality of contactless payment identifiers based on one or more selection criteria, wherein the selection criteria include the user preferences; and transmit a payment request for one or more purchases using the payment account corresponding to the selected contactless payment identifier.

14. The computer program product of claim 13 wherein the set of instructions further comprise instructions effective to:

storing the one or more user preferences in a memory area included in at least one of a plurality of contactless payment cards associated with the contactless payment identifiers prior to the retrieval of the contactless payment identifiers; and identify the selected contactless payment identifier based on the received user preferences.

15. The computer program product of claim 14 wherein the set of instructions further comprise instructions effective to:

automatically select the selected contactless payment identifier in response to comparing the user preferences with one or more monetary incentives provided by using the selected contactless payment identifier.

16. The computer program product of claim 13 wherein the set of instructions further comprise instructions effective to:

receive a receipt in response to the transmitting;

wirelessly transmit the receipt to the contactless payment card associated with the selected contactless payment identifier; and store the receipt in a memory included in the contactless payment card.

17. The computer program product of claim 13 wherein the set of instructions further comprise instructions effective to:

store the user preferences in a portable profile that is stored in a memory proximate a plurality of contactless payment cards pertaining to the separate payment accounts; and retrieve, at the wireless point-of-sale reader, the user preferences from the portable profile prior to the automatic selection of one of the contactless payment identifiers.

18. The computer program product of claim 13 wherein the set of instructions further comprise instructions effective to:

notify the user of the plurality of contactless payment cards of the automatically selected contactless payment identifier used in transmitting the payment request.

* * * * *